US005943608A

United States Patent [19]

Sherman

[11] Patent Number: 5,943,608

[45] **Date of Patent: *Aug. 24, 1999**

[54] TRAFFIC MANAGEMENT METHODS FOR MITIGATION OF INTERFERENCE BETWEEN SIGNALS OF SATELLITE SYSTEMS IN RELATIVE MOTION

[75] Inventor: Matthew J. Sherman, North Arlington, N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/684,647

[22] Filed: Jul. 19, 1996

[51] Int. Cl.[6] ........ G01S 5/02

[52] U.S. Cl. ........ 455/63; 455/12.1; 455/13.4; 455/427; 370/317; 370/318

[58] Field of Search ........ 455/63, 67.1, 67.3, 455/12.1, 13.4, 427, 454; 370/317, 318

[56] References Cited

U.S. PATENT DOCUMENTS

| | | | |
|---|---|---|---|
| 5,617,100 | 4/1997 | Akiyoshi et al. | 455/12.1 |
| 5,640,386 | 6/1997 | Wiederman | 455/12.1 |

OTHER PUBLICATIONS

"Co–Directional Frequency Sharing Between NGSO MEO MSS Feeder Links and GSO FSS Service Links in the 29.1–29.5 GHz and 19.3–19.7 GHz Bands", International Telecommunication Union, Radiocommunications Study Group, Document 4A/33–E, Mar. 18, 1996, pp. 1–34.

"Frequency Sharing Of The Bands 19.3–19.6 GHz and 29.1–29.4 GHz Between Non–GSO MSS Feeder Links and GSO FSS Networks", International Telecommunication Union, Radiocommunication Study groups, Delayed Contribution, Document 4A/46–E, Mar. 19, 1996, pp. 1–10.

Federal Communications Commission, Washington DC document: "Consolidated Coments And Petition To Deny" of Motorola Satellite Communications, Inc., Applicants: AT&T Corp. et al, pp. 1–6; Appendix 1, 23 pgs.

*Primary Examiner*—Anand S. Rao

[57] ABSTRACT

In an environment of competing satellite systems having in part shared bands/channel frequencies and at least one system having non-interfering dedicated bands/channels, interference between shared bands/channels of the two systems is mitigated by a method as recited in the appended claims, interference probabilities are determined and based on these probabilities and interference criteria to be met. Interference is minimized by making initial channel assignments to dedicated channels and assigning shared channels in accordance with traffic controls and limits are developed so as not to violate the interference criteria.

17 Claims, 3 Drawing Sheets

TRAFFIC MANAGEMENT METHODS FOR MITIGATION OF INTERFERENCE BETWEEN SIGNALS OF SATELLITE SYSTEMS IN RELATIVE MOTION

FIELD OF THE INVENTION

This invention relates to a method of managing satellite network traffic and in particular to mitigating interference between satellite networks sharing in part some common channels or frequencies. It is particularly concerned with shared frequency interference between a satellite network using geosynchronous satellites and a satellite network using non-geosynchronous satellites, or two non-geosynchronous satellite networks.

BACKGROUND OF THE INVENTION

Many proprietary communication networks use adjacent channel frequencies and in some instances share common frequency bands or channels with other communication networks. In wireless communication systems using satellite connections, where the satellites of different communication systems experience relative motion with one another, interference between shared or common channel frequencies may result from the relative motions between the satellites of the different systems as the geometric distance between two or more beamed channels is reduced. This often occurs when one system uses geosynchronous satellites and another system with a shared frequency uses non-geosynchronous satellites. Such interference can also occur between two systems each using non-geosynchronous satellites. This interference between the two systems is a pseudo-random event that produces undesirable interference between the two systems.

Such interference degrades customer service. Proposed limits for such degradation are often expressed in terms of interference to noise ratios and a % time during which the ratios may be exceeded. A set of such limits is now being developed under the auspices of the ITU (i.e., International Telecommunication Union). It is desirable to avoid such interference to maintain customer satisfaction as well as a necessity to meet standards which limits such interference.

SUMMARY OF THE INVENTION

According to the invention, in an environment of competing satellite systems (i.e., one system using geosynchronous satellites or non-geosynchronous satellites and the other system using non-geosynchronous satellites) having in part shared bands/channel frequencies and at least one system having non-interfering dedicated bands/channels, interference between shared bands/channels of the two systems is mitigated by a method as recited in the appended claims.

In an illustrative embodiment of the invention, interference probabilities are determined. Based on these probabilities and interference criteria, as established by managing bodies such as the ITU, network usage limits of shared channels are developed. Using these limits the interference is minimized by, in at least one system making initial channel assignments to dedicated channels and assigning shared channels so as not to violate the interference criteria.

In a specific application utilizing a cascade link analysis as is known to those skilled in the art, having interference in uplink bands only, downlink EIRP (i.e.,Effective Isotropic Radiated Power, maximum transmitted power and antenna gain) is maximized to mitigate uplink interference when uplink/downlink bands are only partially populated.

In a cascade noise analysis (i.e., no signal regeneration between up and down link signals) noise effects in the up and down link are additive. Overall link performance is achieved by keeping the sum of these effects less than a given constant. By increasing the downlink power available to a user we reduce the noise effects on the downlink. Since the sum of the noise effects must be less than a constant, decreasing the downlink noise effects allows for an increase in uplink noise effects for the same specified overall performance. This means uplink TX power can be reduced (increasing uplink noise effects) decreasing the amount of interference presented to other systems. By always dividing the available downlink power by the number of users (i.e., maximizing down link power per user) interference during periods of off peak traffic is greatly reduced. The sum of uplink "u" and downlink "d" power ratios equaling regulated "reg" power ratio being related as:

$$\left(\left(\frac{C_o}{N_o}\right)_u^{-1}+\left(\frac{C_o}{N_o}\right)_d^{-1}\right)^{-1}=\left(\frac{C_o}{N_o}\right)\text{REG.}$$

Further mitigation, if necessary, is achieved by limitation of allowable subscriber initiated calls as described below.

DETAILED DESCRIPTION

Figure 1:
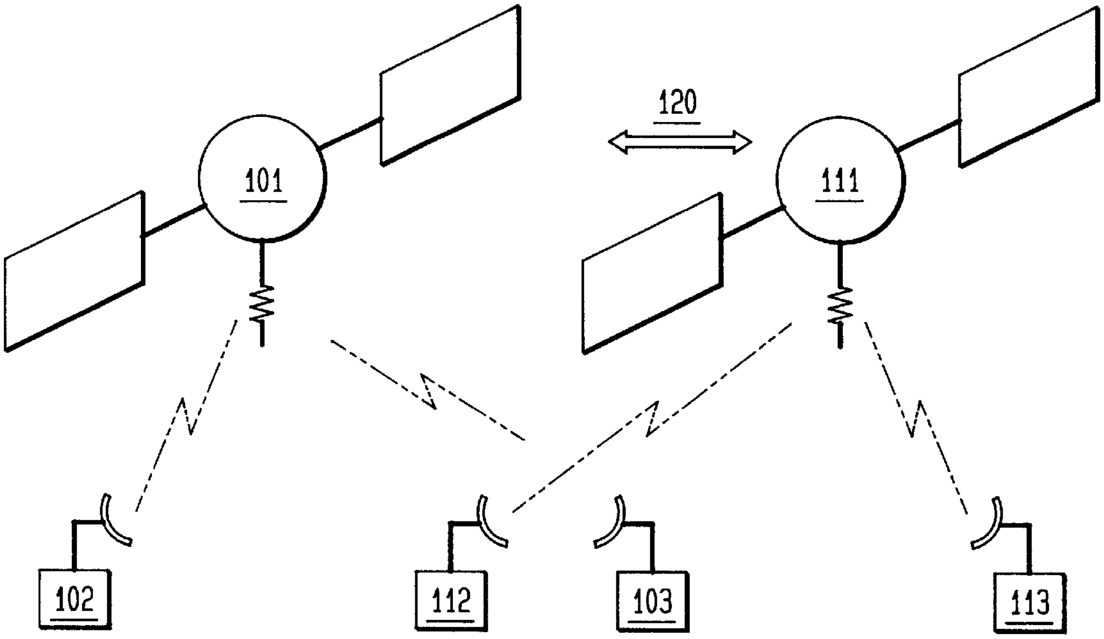
FIG. 1 is a schematic of two independent communication systems, each using satellites, in relative motion with one another and in which interference between channels of the two systems may occur.

A schematic of two wireless communications systems, as shown in FIG. 1 shows one system as having a geosynchronous connecting satellite 101 and the other system as having a non-geosynchronous connecting satellite 111. The geosynchronous satellite 101 interconnects two ground stations 102 and 103. The non-geosynchronous satellite 111 connects two ground stations 112 and 113. As indicated by arrow 120 the satellite 111 is in relative motion with the satellite 101. This relative motion affects the geometric separation of the air interface paths of the two systems. While at least one system has dedicated air interface channels, some channels are shared by the two systems. Due to the relative motion the shared channels interfere with one another in varying degrees. Such interference will be restricted by issued standards of the ITU and other agencies. It is necessary to limit use of the shared channels in a manner that accommodates the issued standards. While the illustration shows one particular system it is to be understand that the principles of the invention apply to any system where satellites, of differing systems, are in relative motion to one another.

Figure 2:
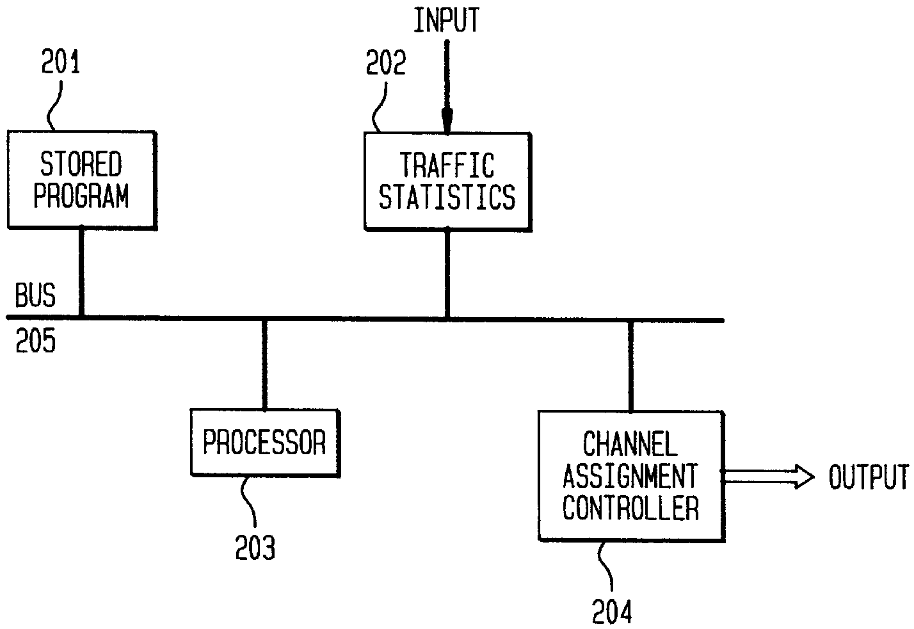
FIG. 2 is a schematic block diagram of a stored program processor used for determining criteria of interference.

A computing environment as shown in the FIG. 2 provides a means of assessing traffic patterns and converting the patterns into a mask for controlling the assignment of channels. A stored program storage 201 is connected to the bus 205. for processing the assignment of channels and the mask defining the limits developed for such assignment. Bus 205 is is connected to memory 202 including the traffic statistics of the system for which channels are to be assigned. The statistics are processed by the processor 203 to generate the masks defining traffic limits and to assign channels according to the mask. The assignments generated are transmitted over the bus to the channel assignment controller 204 which outputs the information in tangible form or in a form to automatically control channel assignment.

Figure 3:
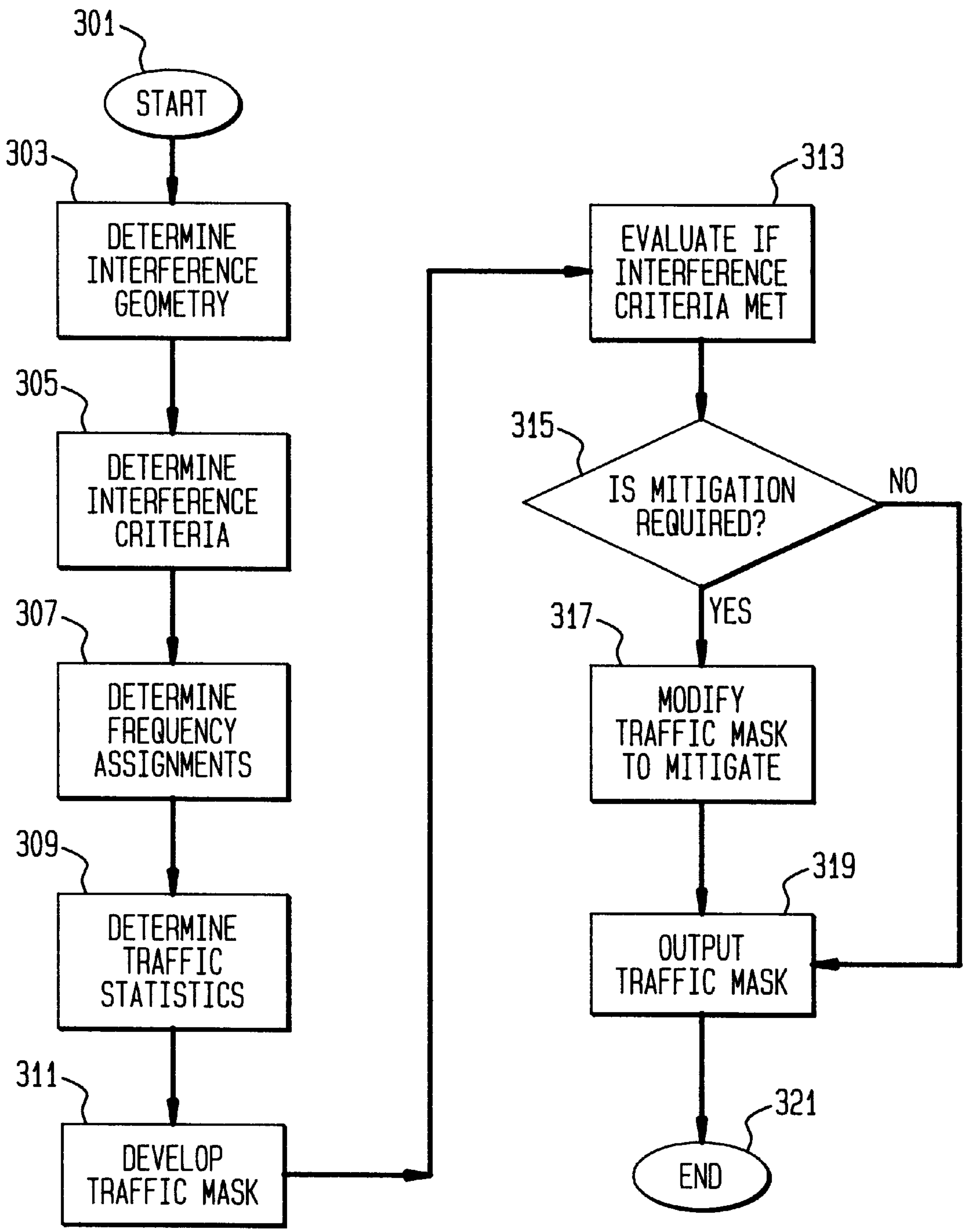
FIG. 3 is a flow chart of a process for determining limits on channel assignment based on by the interference criteria.

The process of generating the limits and the mask are shown in the flow chart of FIG. 3. The terms of art specified, below, as defined by the ITU and are known to those skilled in the art. The process begins at start 301 and in block 303 the geometry of the interference, of the two systems, is entered. Interference criteria defined by the appropriate administration is entered in the block 305. The frequency assignments of the two systems identifying dedicated and shared channels and are entered in the block 307. Traffic statistics of the two systems are entered in block 309. Initial traffic masks are created based on the traffic patterns in block 311. The frequency plans may be time varying in which case this process could run in real time to constantly update the traffic mask.

The allowable interference to noise ratio, from the interference criteria, is referenced in the block 313 and a percentage of expected interference for these channels is calculated in the block 313 to see if the interference criteria is met. In decision block 315 a determination is made as to the need for mitigation and if so, needed limits to attain the mitigation are determined in block 317 by modifying the initial traffic mask of block 311. These limits are achieved by reducing the initial traffic mask of the block 311 being mitigated so as to meet the interference criteria while minimizing impact on capacity and revenue. One method is to reduce all parts of the mask by some minimum percentage such that the criteria are met. The traffic mask is modified as per block 317 to achieve mitigation. A controlling traffic mask defining the availability of channels is output as per block 319. The process is ended in the end terminal 321.

Figure 4:
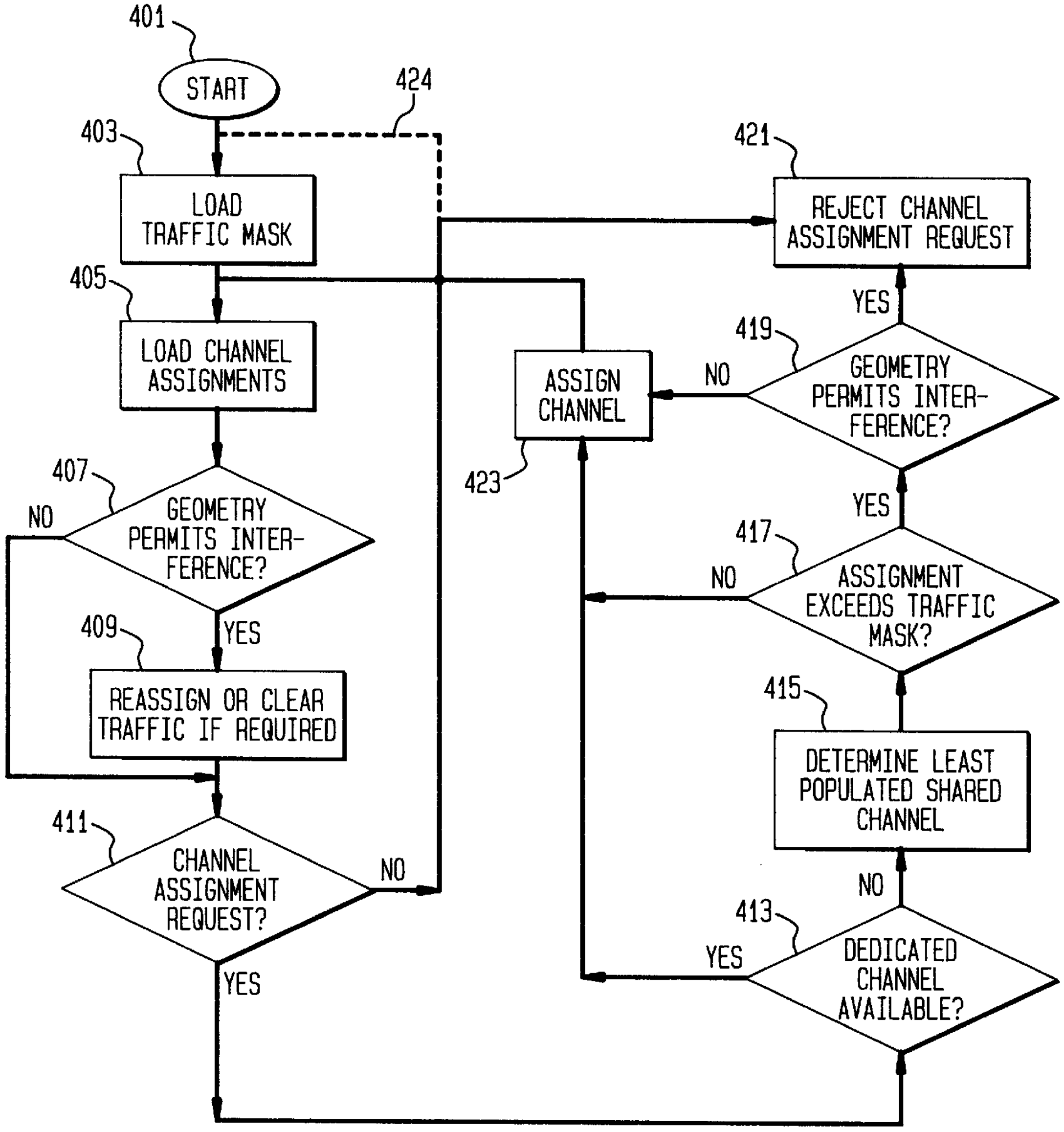
FIG. 4 is a flow chart for controlling channel assignment in accord with limits defined by interference criteria.

The process of channel assignment control is shown in the flow chart of FIG. 4. After the start terminal 401 the traffic mask is downloaded as per block 403 and the channel assignment loaded as per block 405. The interference geometry is evaluated to see if it allows interference to occur in block 407. If it does (Yes) traffic is reassigned or cleared to meet the interference requirement in block 409. If geometry does not permit interference (No) the flow proceeds to block 411 which responds to requests for channel assignment in the system. Upon the receipt of a channel assignment request, as determined by decision block 411 a determination is made as to availability of a dedicated channel in decision block 413. If no channel request is received (No) flow returns to block 407. If a dedicated channel is available (Yes) the assignment is made as per block 423. Flow returns to block 407 after channel assignment. In the absence of an available dedicated channel (No) a least populated shared channel is located in the block 415 and possible assignment of this channel is tested in block 417 to determine if it fits the traffic mask. Decision block 419 determines if the geometry permits interference. If the geometry permits interference the channel assignment request is rejected as indicated in block 421. If no interference is determined the channel is assigned as in block 423. Flow returns to the input of decision block 407.

In instances where the channel assignments change in time, the process may be made adaptive by running the process in FIG. 3 repetitively, via dotted line 424 to block 403 in FIG. 4.

The process also benefits from the inclusion of satellite ephemeris data and the interference geometry. When it is known that interference is impossible traffic mask restrictions can be eliminated until such time when the potential for interference exists again.

The invention claimed is:

1. A method of mitigating interference between two independent wireless systems due to traffic, a first system including a geosynchronous satellite connection and a second system including a non-geosynchronous satellite connection and the two independent wireless systems being in relative motion with one another; the first system having dedicated channels which are non-interfering with channels of the second system and shared channels which interfere with channels of the second system due to relative motion of the synchronous and non-synchronous satellites to one another;

the method comprising the steps of:

mitigating the interference by means of traffic flow control of channels shared by the first and second systems, the method steps including:

generating traffic statistics for at least the first system;

initially assigning channel requests in the first system to dedicated channels until the dedicated channels are fully subscribed;

determining acceptable interference criteria;

limiting channel assignments in shared bands of the geosynchronous and non-geosynchronous satellites, until after full subscription of the dedicated channels to accommodate the traffic statistics and the interference criteria, by:

restricting the assignment of channel requests to shared bands to achieve a minimum limitation of blocking of connections, and limiting the number of users assigned channel requests as subscribers during intervals of high interference probability.

2. A method of mitigating interference between two independent wireless systems due to traffic, a first system including a geosynchronous satellite connection and a second system including a non-geosynchronous satellite connection and the two independent wireless systems being in relative motion with one another; the first system having dedicated channels which are non-interfering with channels of the second system and shared channels which interfere with channels of the second system due to relative motion of the synchronous and non-synchronous satellites to one another;

the method comprising the steps of:

mitigating the interference by means of traffic flow control of channels shared by the first and second systems, the method steps including:

generating traffic statistics for at least the first system by entering the traffic patterns and frequency plans onto a process and entering an interference to noise ratio onto the process;

ascertaining applicable interference criteria;

creating limits on channel assignments based on the traffic statistics and the interference criteria by creating a traffic mask; and assigning channels to abide with the created limits including assigning channels to dedicated channels first and to shared channels in an absence of dedicated channels.

3. The method of claim 2, wherein:

the step of creating limits includes:

entering traffic patterns and frequency plans onto a process, and entering an interference to noise ratio onto the process.

4. The method of claim 3, wherein:

a need for mitigation is established, and a traffic mask is created.

5. The method of claim 4, wherein:

assigning channels includes assigning channels to dedicated channels first.

6. The method of claim 5, wherein:

assigning channels to shared channels in the absence of dedicated channels and only if the traffic mask is not exceeded.

7. A method of mitigating interference between two wireless systems due to traffic each having a satellite connection between originating and terminating terminals and the satellites having relative motion with respect to one another;

the method comprising the steps of:

mitigating the interference by means of traffic flow control of channels shared by the first and second systems, the method steps including:

generating traffic statistics for at least one of the two systems;

initially assigning channel requests in one of the two systems to dedicated channels until the dedicated channels are fully subscribed;

determining acceptable interference criteria;

limiting channel assignments in shared bands, after full subscription of the dedicated channels; to accommodate the traffic statistics and interference criteria, by;

restricting assignment of channel requests to shared bands to achieve a minimum limitation of blocking of connections, and limiting the number of assigned channel requests during intervals of high interference probability.

8. The method of claim 7, wherein the step of generating traffic statistics includes:

determining traffic patterns of the two systems, determining frequency assignment plans of the two systems; and determining acceptable I/N ratios.

9. The method of claim 8, wherein generating a traffic mask for controlling channel assignment.

10. A method of controlling network traffic to mitigate interference between wireless networks, with satellites of a first and second network in relative motion with respect to one another; the first network sharing channels which interfere with the second network; and the first network having dedicated channels which are non-interfering with channels of the second network;

the method comprising the steps of:

mitigating the interference by means of traffic flow control of channels shared by the first and second networks, the method steps including:

determining present channel assignments between the networks;

determining a traffic mask for shared channels in the first network;

assigning traffic from users in the first network to dedicated channels if available;

suspending the traffic mask if it is apparent from the interference geometry that no potential for interference exists; and limiting channel assignments in the first network for the shared bands to conform to the traffic mask should a potential for interference exist.

11. The method of claim 10; comprising the further step of:

optimizing uplink and downlink power in the shared channels of network one to minimize interference with the second network should the satellite transponders be non-regenerative.

12. The method of claim 11; comprising the further step of:

iterating the steps of assigning traffic of channels should frequency assignments be time varying.

13. The method of claim 10, wherein the step of assigning includes assigning dedicated network channels before shared channels.

14. The method of claim 10, wherein assigning shared channels is blocked should the assignment exceed the traffic mask.

15. The method of claim 10, wherein determining a traffic mask includes enveloping the determined traffic statistics.

16. A method of determining a traffic mask for mitigating interference between wireless networks by means of traffic flow control of channels shared by the individual networks where a first network satellite is in relative motion to a second network satellite; and the first network sharing channels which interfere with same channels of the second network and having dedicated channels which are non-interfering with channels of the second network;

the method comprising the steps of:

mitigating the interference by means of traffic flow control of channels shared by the first and second network, the method steps including:

determining an interference geometry;

determining interference criteria including percent of time interference allowed at or above specific interference levels;

determining frequency assignments of the first and second networks;

setting traffic statistics of the first and second networks;

developing a traffic mask for the first network based on set traffic statistics;

for each interference level determining if a percent time of interference specified by interference criteria is met based on the traffic mask;

modifying the traffic mask if needed to reduce interference to allowed levels.

17. The method of claim 16; wherein:

setting traffic statistics includes assuming full time use of all channels.

* * * * *